Oct. 2, 1945.  L. N. LINSCOTT  2,385,925
APPARATUS FOR MAKING PILE PRODUCTS
Filed Jan. 15, 1943   13 Sheets-Sheet 1
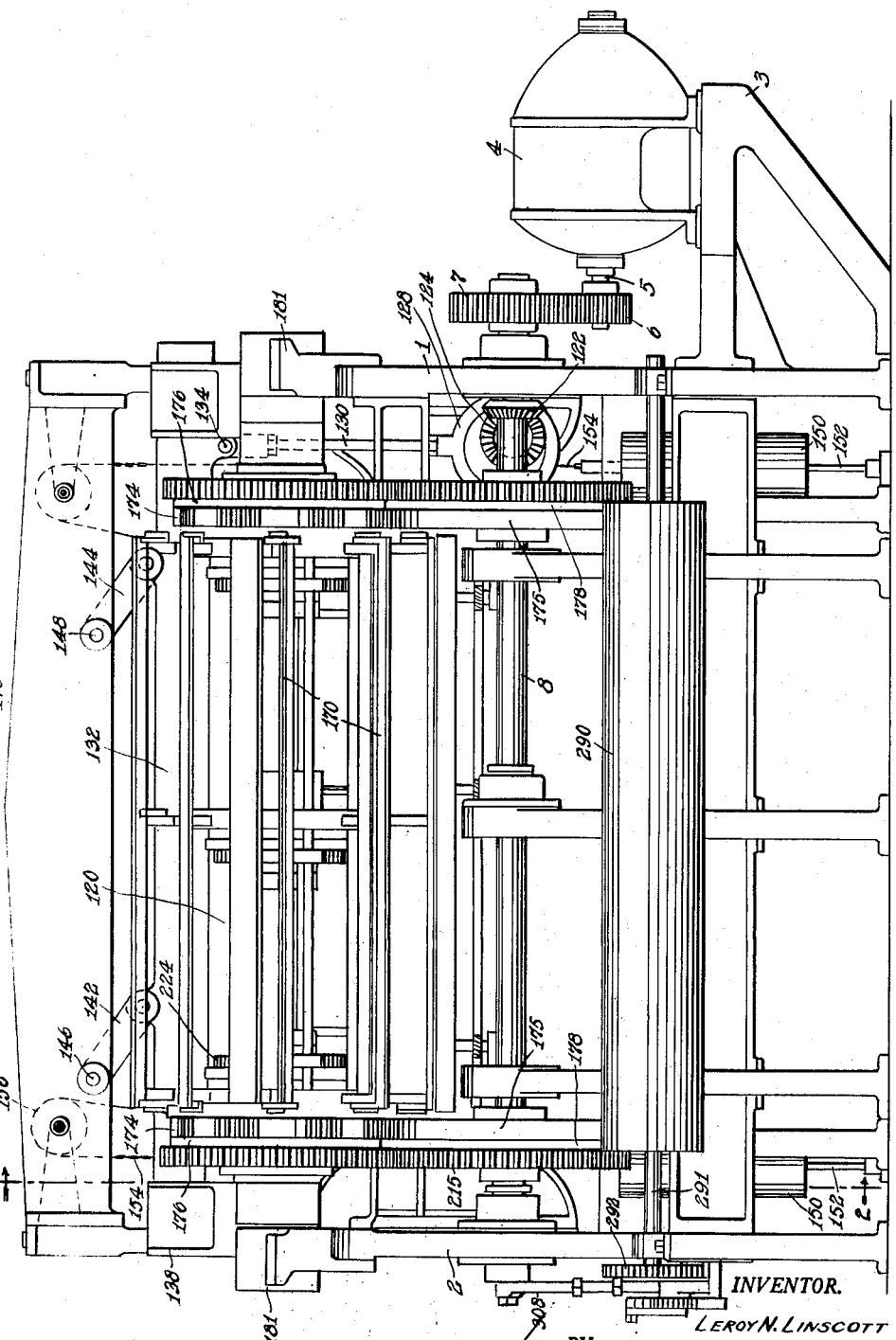
INVENTOR.
LeroyN.Linscott
BY
ATTORNEY.

Oct. 2, 1945.  L. N. LINSCOTT  2,385,925
APPARATUS FOR MAKING PILE PRODUCTS
Filed Jan. 15, 1943  13 Sheets-Sheet 2
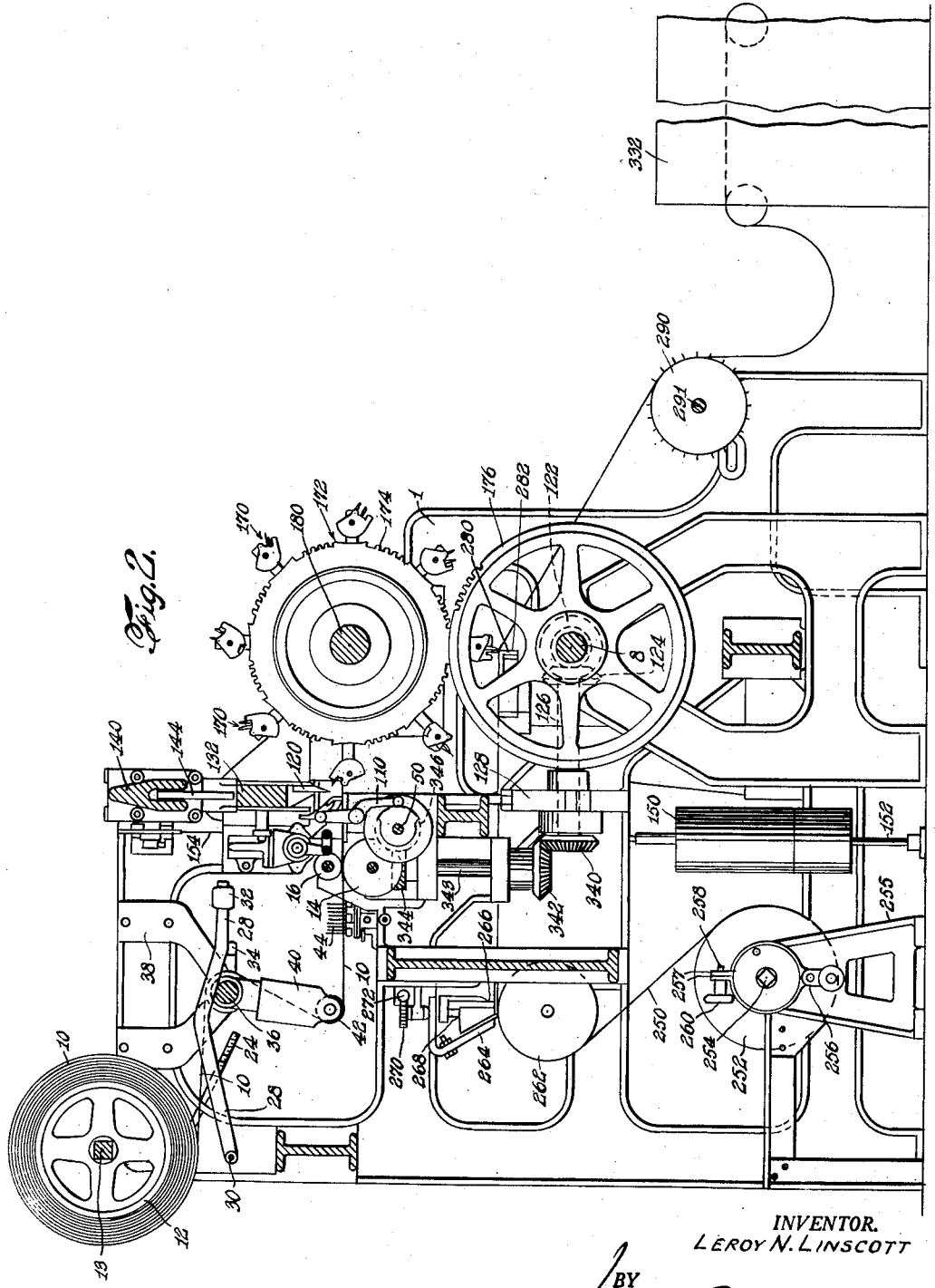
INVENTOR.
LEROY N. LINSCOTT
BY
ATTORNEY.

Oct. 2, 1945.   L. N. LINSCOTT   2,385,925
APPARATUS FOR MAKING PILE PRODUCTS
Filed Jan. 15, 1943   13 Sheets-Sheet 3
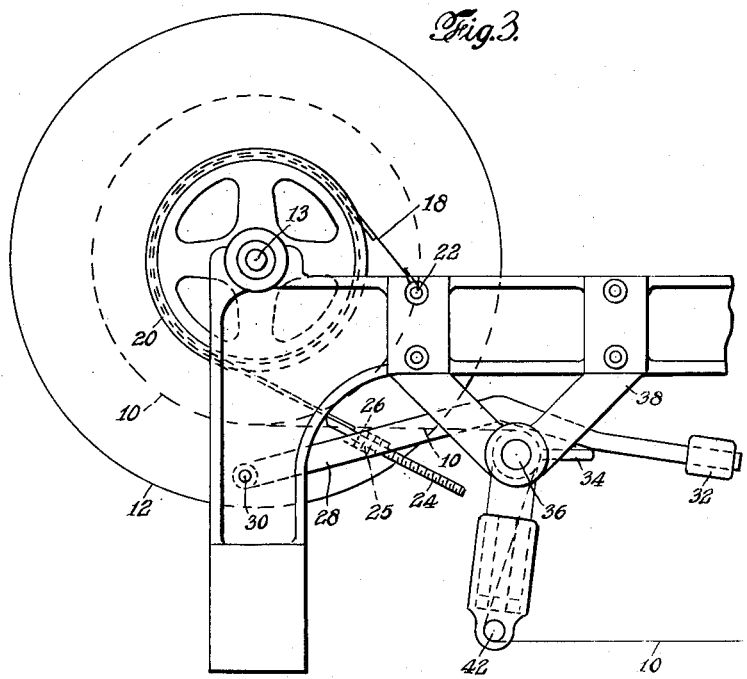
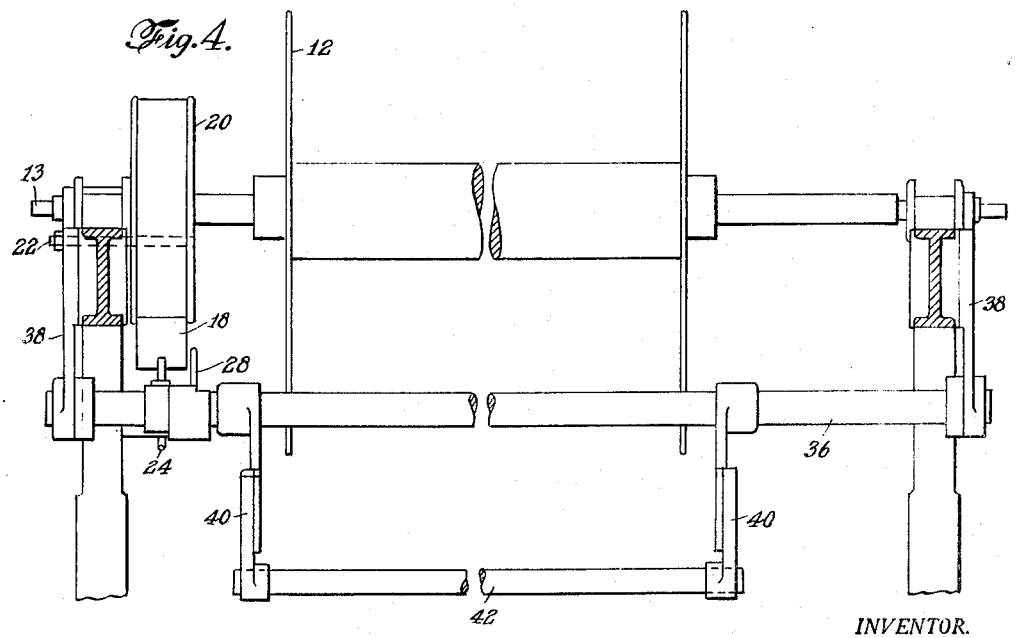
INVENTOR.
LEROY N. LINSCOTT
BY
*Wm. S. Pritchard*
ATTORNEY.

Oct. 2, 1945.    L. N. LINSCOTT    2,385,925
APPARATUS FOR MAKING PILE PRODUCTS
Filed Jan. 15, 1943    13 Sheets-Sheet 4
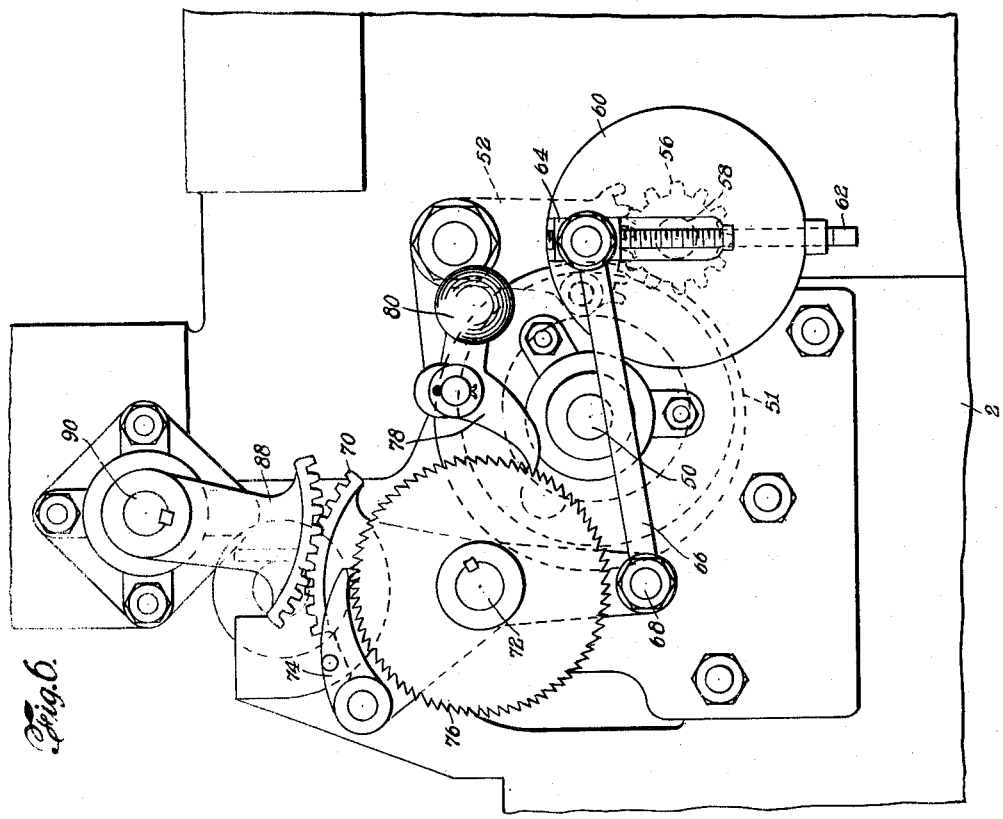
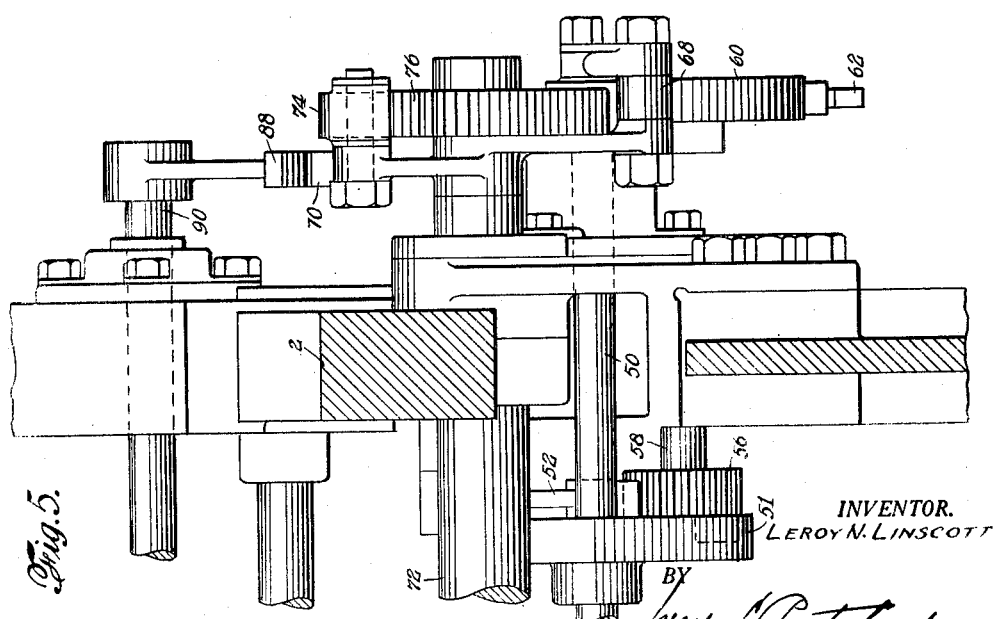
INVENTOR.
LEROY N. LINSCOTT
BY
ATTORNEY.

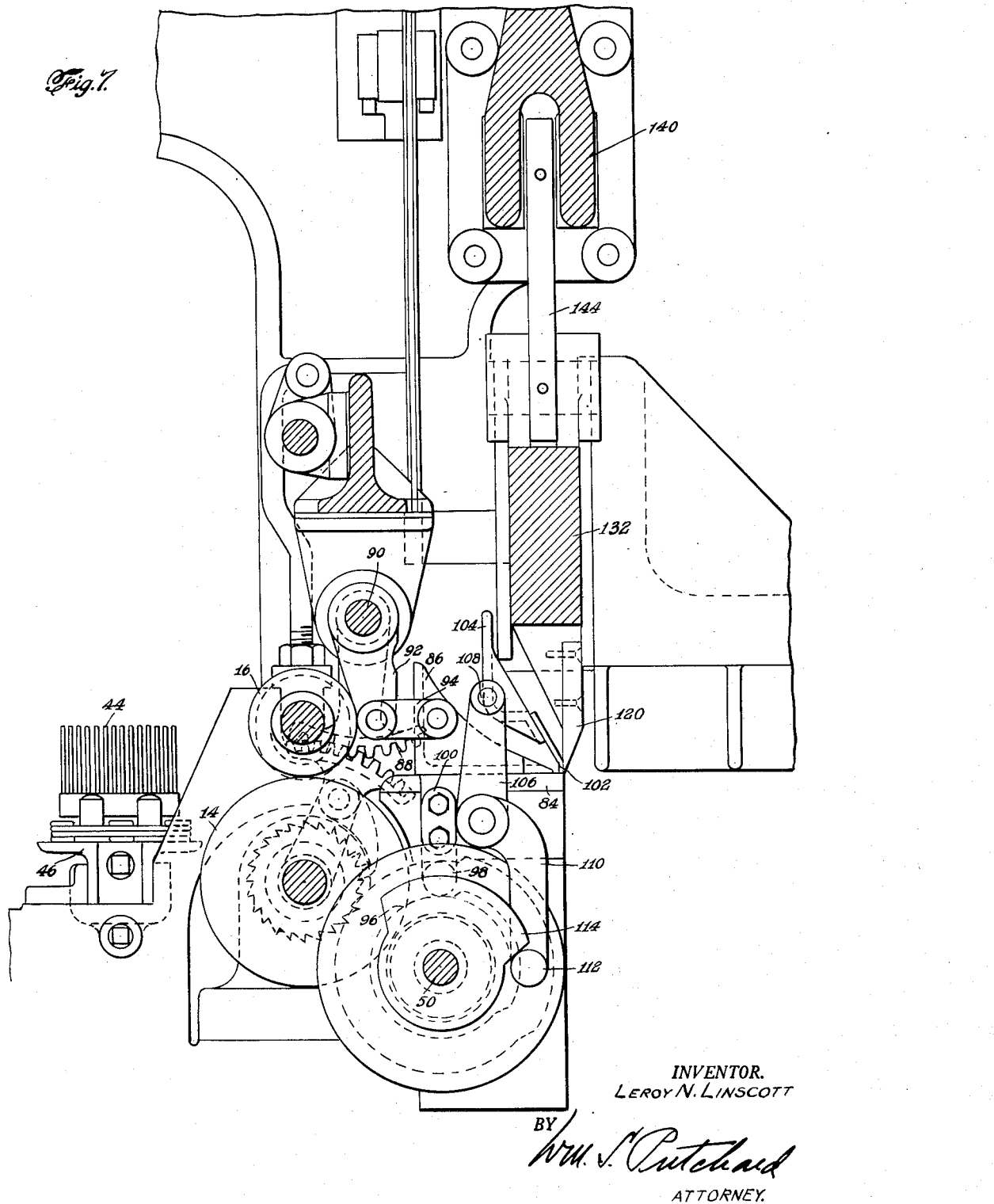

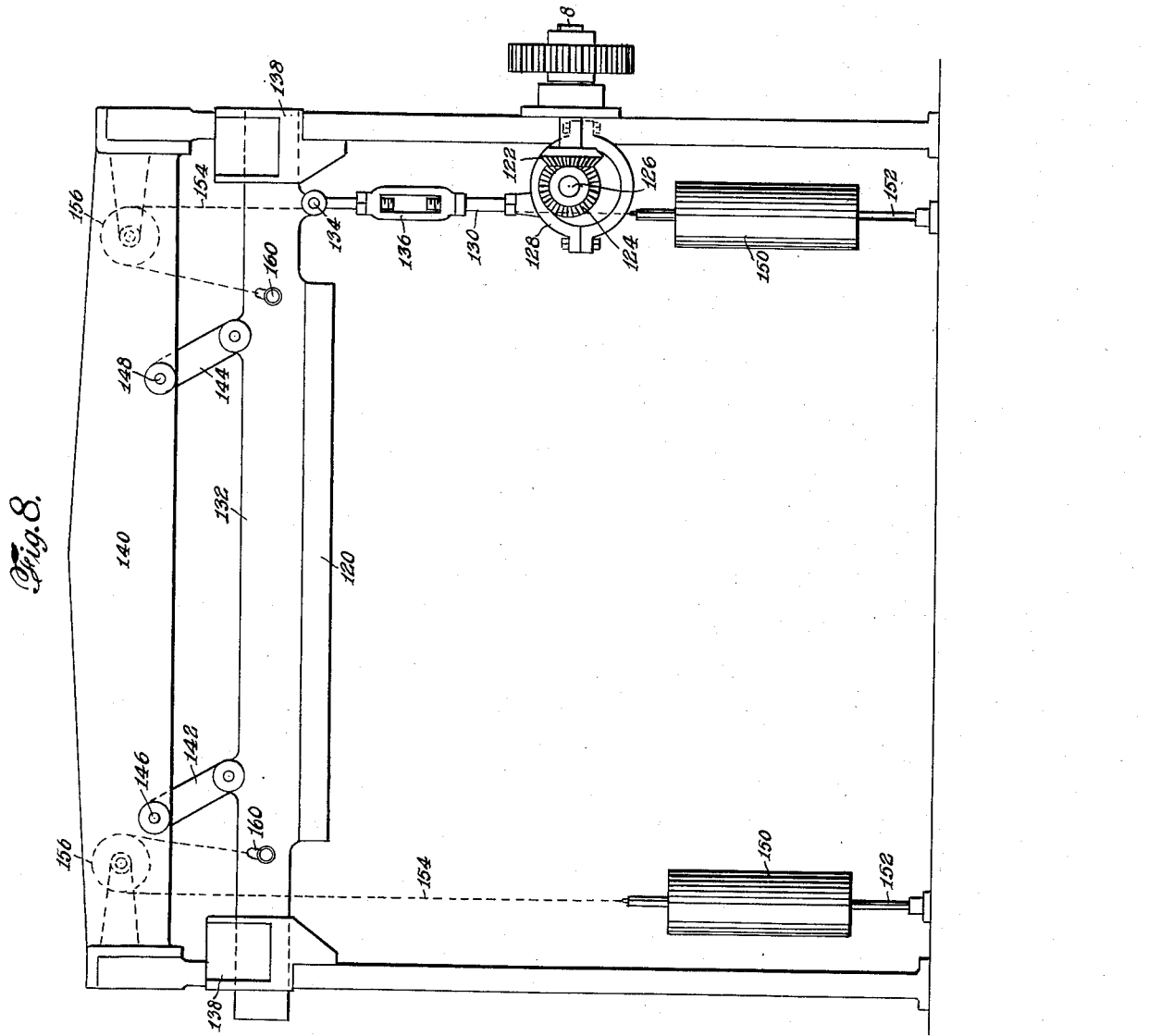

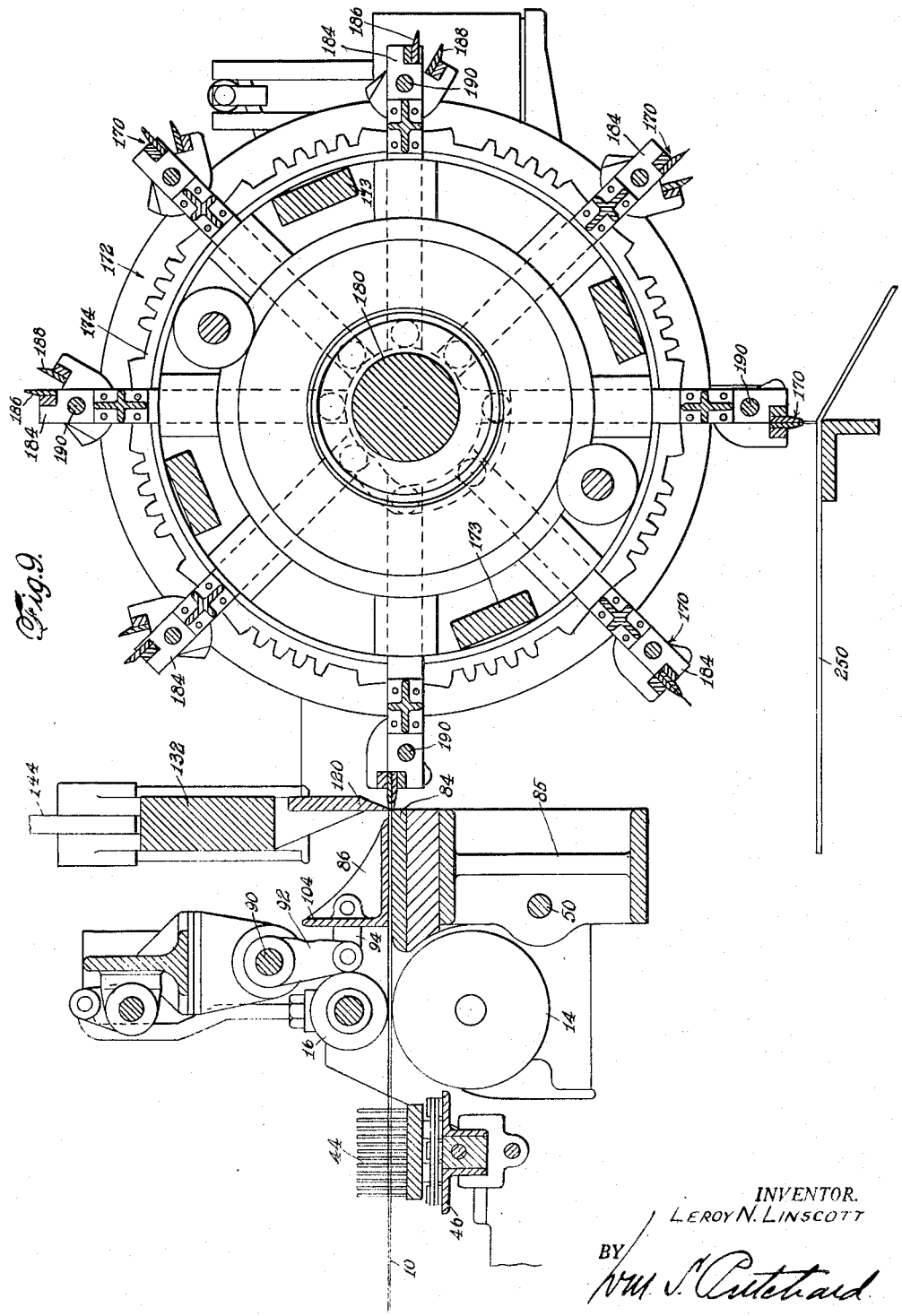

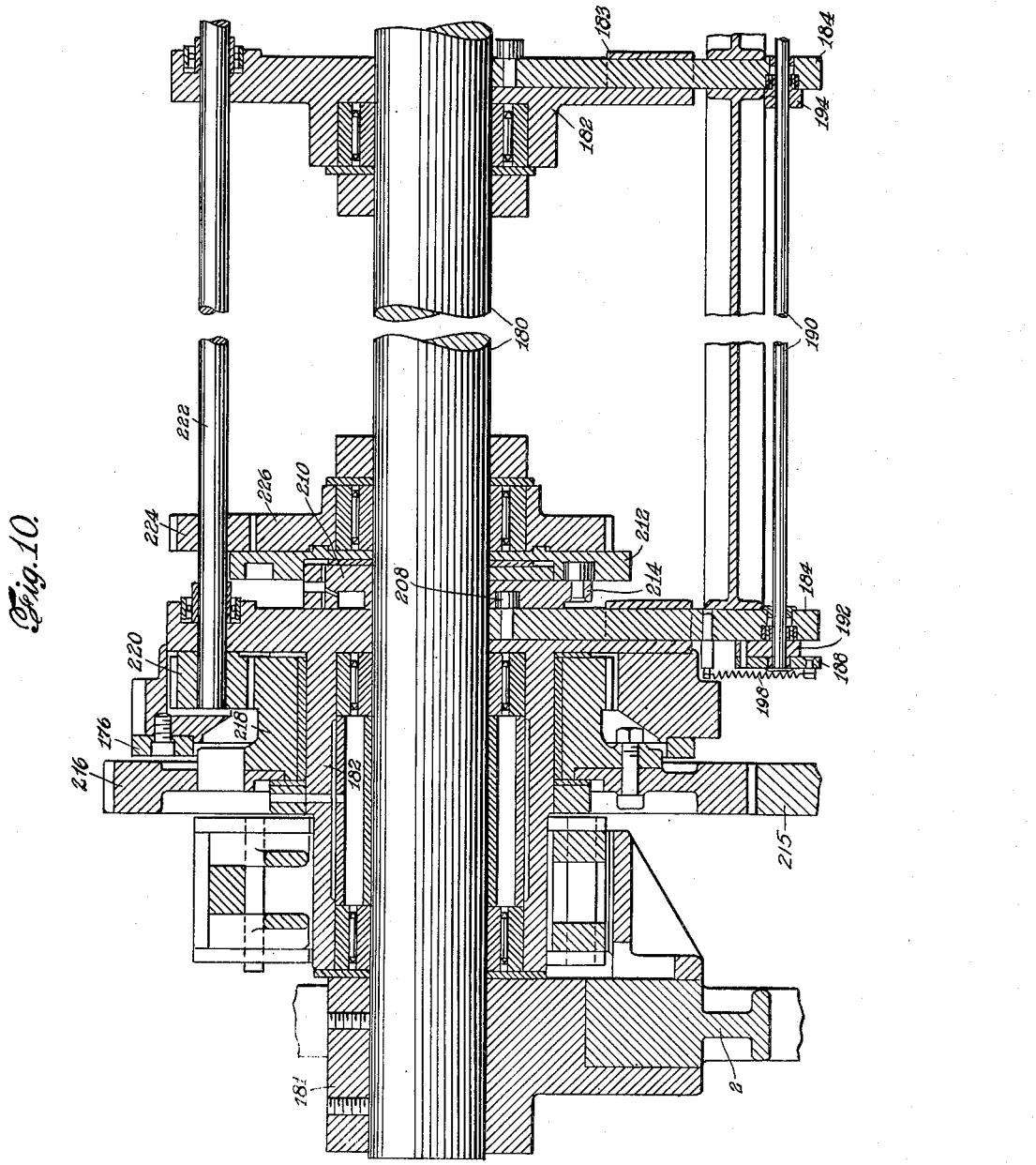

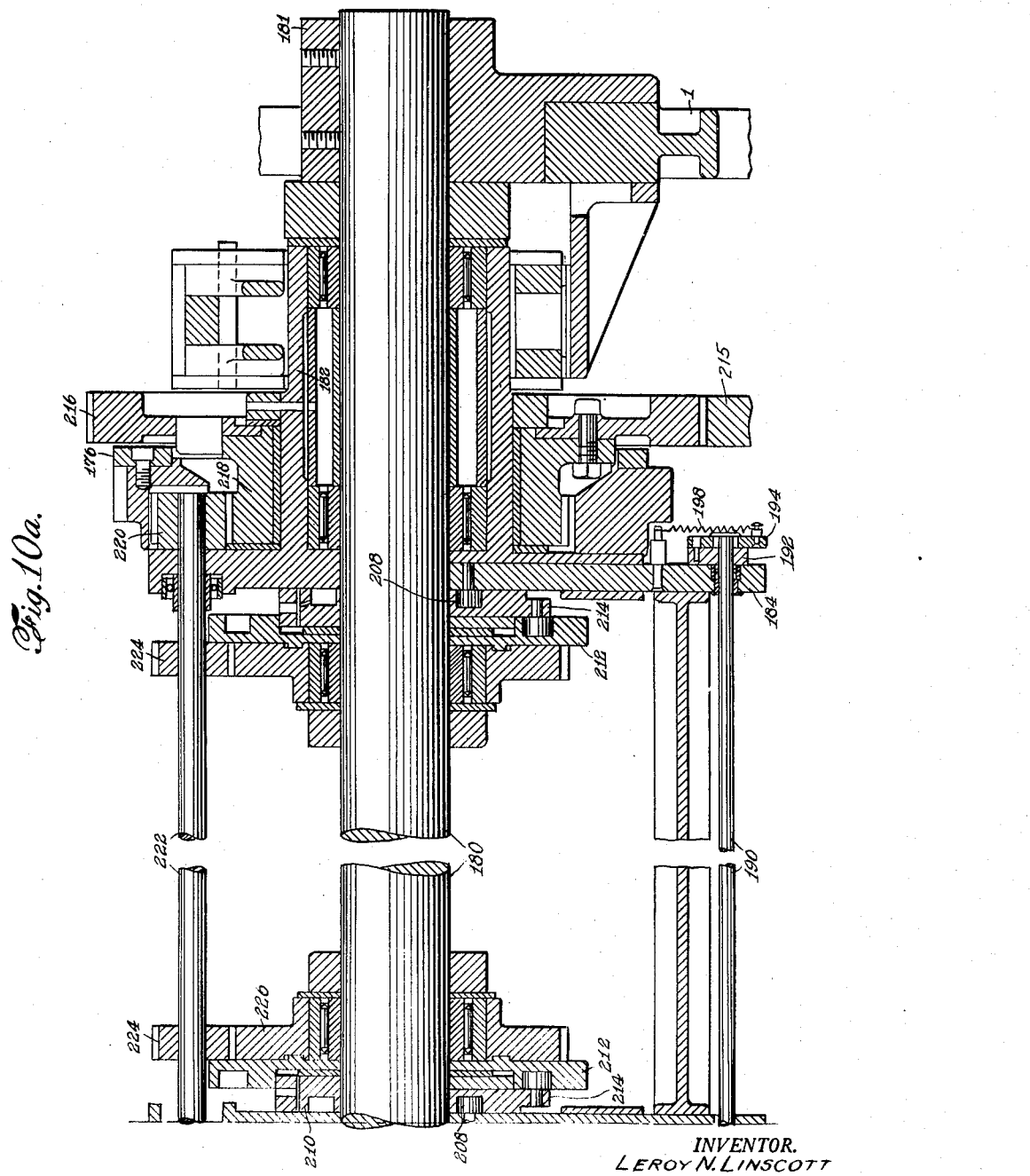

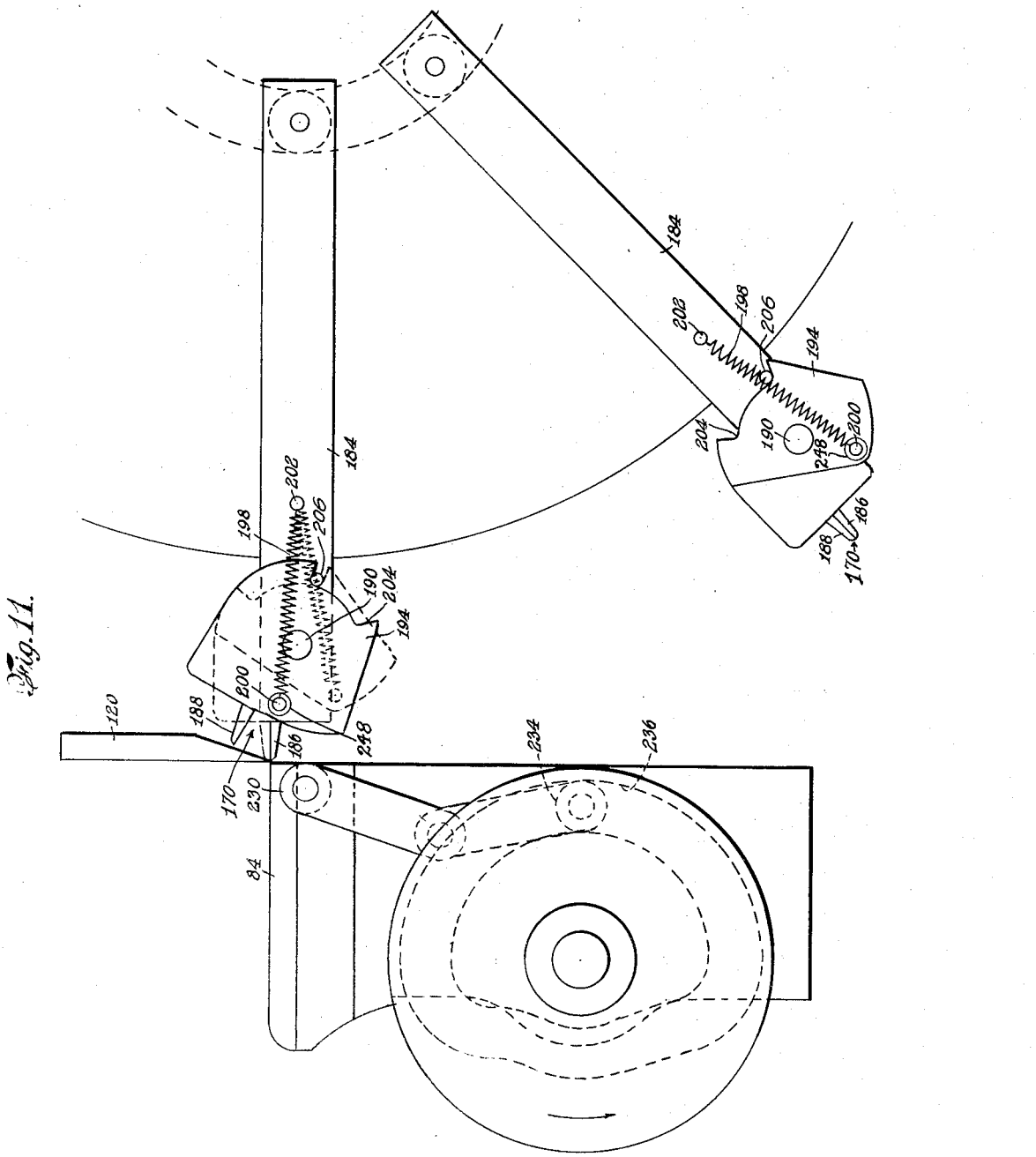

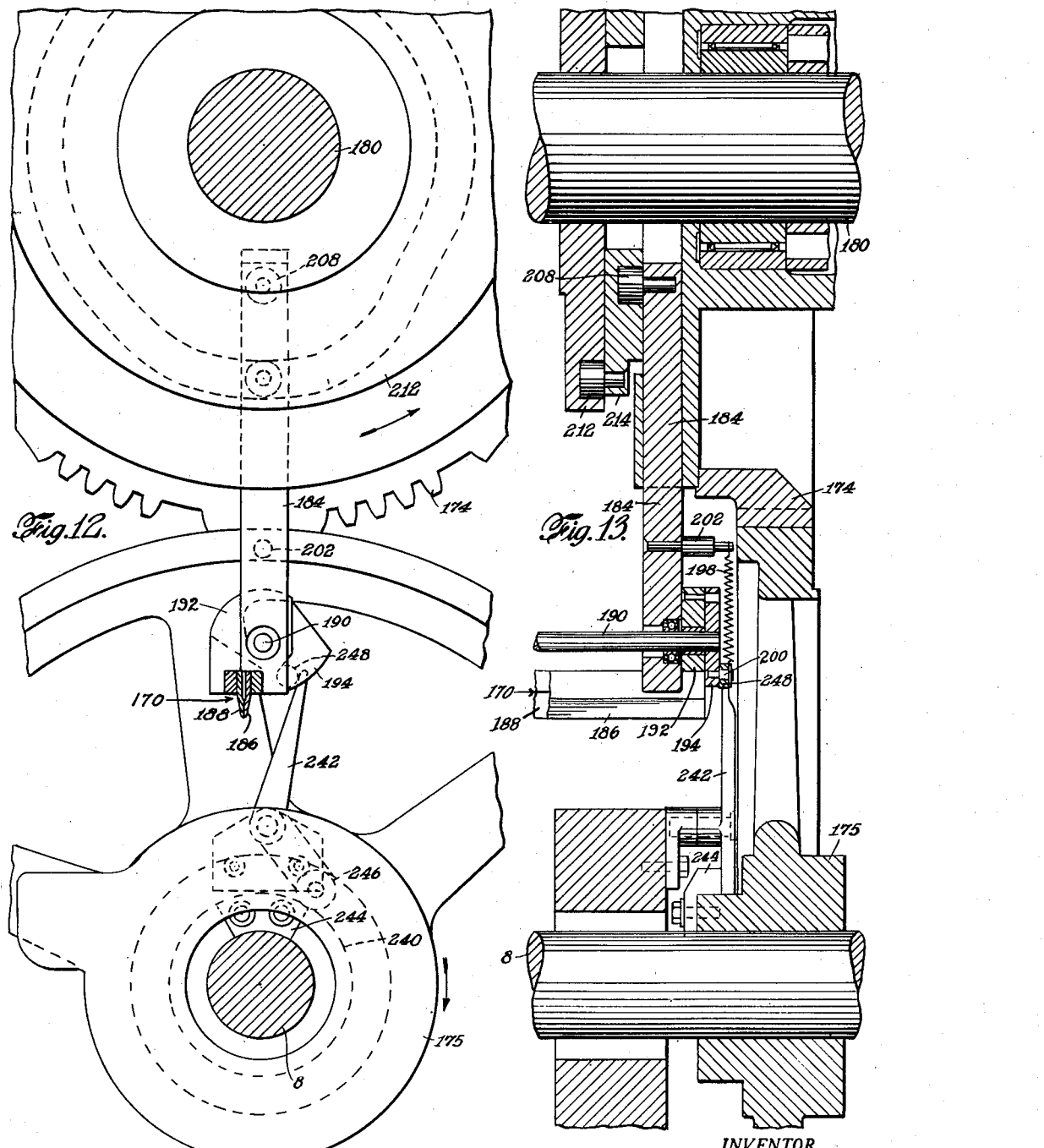

Oct. 2, 1945.  L. N. LINSCOTT  2,385,925
APPARATUS FOR MAKING PILE PRODUCTS
Filed Jan. 15, 1943   13 Sheets-Sheet 12
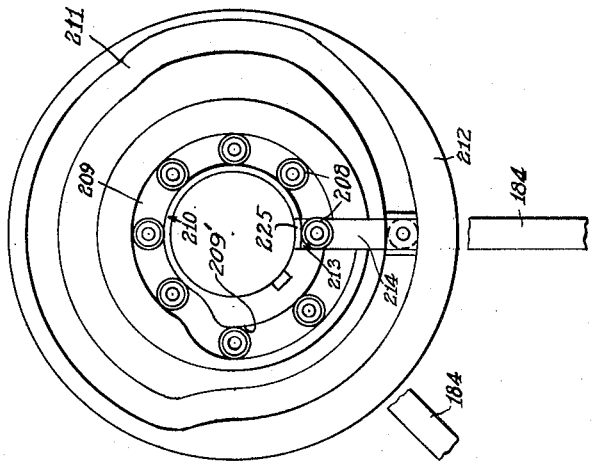
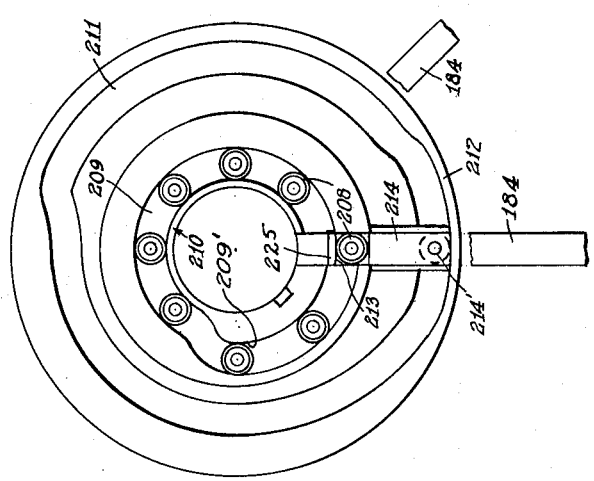
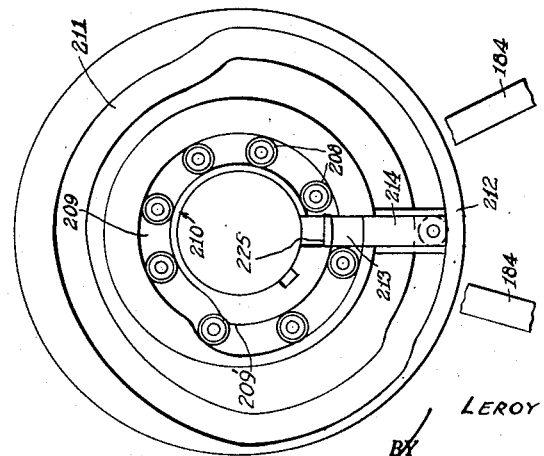
INVENTOR.
LEROY N. LINSCOTT
BY
Wm. S. Pritchard
ATTORNEY.

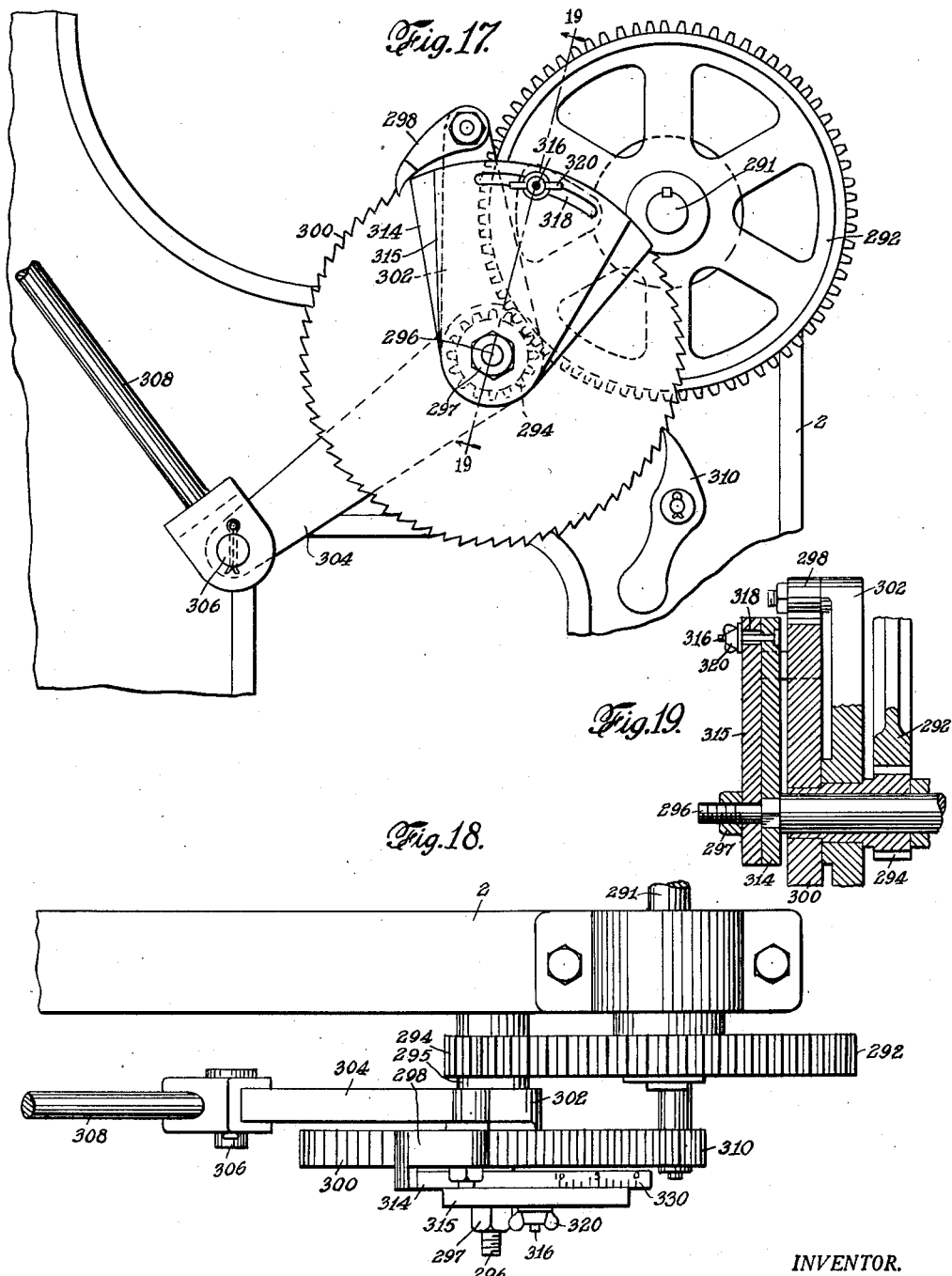

Patented Oct. 2, 1945

2,385,925

UNITED STATES PATENT OFFICE 2,385,925

APPARATUS FOR MAKING PILE PRODUCTS

Leroy N. Linscott, Yonkers, N. Y., assignor to Alexander Smith & Sons Carpet Company, Yonkers, N. Y., a corporation of New York Application January 15, 1943, Serial No. 472,450

8 Claims. (Cl. 154—1)

This invention relates to an apparatus for producing pile fabrics. More particularly, this invention relates to an apparatus for producing pile fabrics wherein the pile-forming elements are embedded in a cementitious coating on a suitable backing to produce a pile fabric in which the pile is in a substantially upright position.

The invention may be employed to produce pile fabrics of various types. When the invention is applied to the production of floor coverings (such as rugs, carpets), upholstery fabrics, etc., the pile is formed of individual yarns of appropriate character as to material and construction. Hereinafter, in this specification and in the claims, for purpose of convenience and brevity, the expression "yarns" is used to cover broadly individual yarns, plied yarns, doubled yarns, strands, rovings or the like of the general character used in carpet and rug manufacture. When the invention is employed in the manufacture of pile fabrics, such as fleeces, artificial fur, etc., the pile may be formed from webs of matted or felted fibers of the general character used in the manufacture of fleeces, artificial fur, etc.

The pile may be formed of any pile-forming material or mixtures thereof. Natural fibers such as wool, alpaca, cashmere, hemp, cotton, linen, silk, etc. or artificial fibers such as viscose rayon, acetate rayon, cuprammonium rayon, nylon, casein, spun glass, etc., used singly or in admixture, are illustrative examples of materials which may constitute the pile.

For the backing, various flexible materials may be used. The backing may be a fabric woven from yarns of jute, hemp, linen, cotton, wool, etc., or yarns formed of artificial fibers such as rayon, casein, etc., alone or in conjunction with one another. The backing may also be formed of sheet or film materials, such as leather, synthetic materials such as films formed of cellulose derivatives, resins, etc.

The cementitious coating in which the pile is embedded and by means of which it is to be secured to the backing may comprise adhesive compositions which are applied either in a liquid or plastic condition and which, upon elimination of the liquid vehicle, such as by drying, will set to form a flexible film. Alternatively, the coating may comprise a flexible thermoplastic coating which will become adhesive upon the application of heat. Rubber (natural or synthetic) compositions, resin compositions and cellulose derivative compositions are illustrative examples of adhesive compositions which have given satisfactory results. When rubber (natural or synthetic) compositions are employed, an accelerator may be incorporated therein whereby subsequent to the embedding of the pile therein the composition, upon subjection to heat, will be vulcanized.

In accordance with one general embodiment of this invention, a plurality of yarns, arranged in parallel relationship and forming what might be called a "weftless fabric" of a width to produce a row of pile extending transversely of substantially the entire width of the backing, is intermittently fed by a step-by-step movement to a cutting station, where the leading end of the "fabric" is severed by a knife having a shearing action and which severs the yarns first at one end of the "fabric" and then progressively toward the other end until all the individual yarns have been severed. Prior to the severance of the yarns, the latter are given a further forward movement to provide a substantially uniform length of yarn to be severed. Also, prior to the severance of the yarns, the latter are engaged rearwardly of the portions thereof to be severed by suitable means to securely hold the yarns during the severing operation. When the yarns have been positioned at the severing station, as above generally described, and still prior to the severing action, the leading ends of the yarns are gripped by a gripper. After the severing of the yarns, the gripper, securely holding the severed portions which will constitute the pile, is advanced by a step by step movement until the pile elements are in a substantially vertical position with the lower free ends of the pile elements spaced from and substantially at right angles to the point of the cementitious coating on the backing at which the pile is to be deposited and embedded. The gripper is given a (vertically) downward movement whereby the free ends of the pile elements penetrate the cementitious coating and are inserted and embedded therein. After the pile has been embedded in the cementitious coating, the gripper releases the pile, is retracted, and the cycle repeated.

A plurality of grippers are equidistantly positioned along the periphery of a rotor which is rotated intermittently about its axis. Each gripper, comprising a pair of jaws, one of which is movable with respect to the other, is carried on an arm which is slidably mounted and actuated by cam mechanisms at certain periods to effect the desired functions. After a gripper has deposited a row of pile into the coating on the backing, the gripper is in a retracted position and the jaws thereof in open position. In this condition, such gripper is intermittently advanced by the intermittent rotation of the rotor until said gripper is in position to grip the leading ends of the yarn at the pile-severing station. At this time, during a period of dwell of the rotor, the arm on which the gripper is mounted is given a forward movement to enable the gripper to grasp the yarn and the movable jaw is actuated to bring the jaws into closed position, gripping the ends of the yarn. After severing of the yarn, the gripper is advanced, by an intermittent motion, to the pile-depositing station where, during a period of dwell of the rotor, the arm carrying the gripper is given a further forward movement (in this case, the movement would be vertically downward), whereby the free ends of the pile are embedded in the coating. Thereafter, the movable jaw is actuated to open the jaws and release the pile, the arm carrying the gripper being retracted, and the cycle repeated. The cycle is the same for each gripper.

The apparatus which constitutes one phase of this invention includes many novel elements and combinations of mechanisms and is characterized by extreme precision and capacity for adjustment to secure any desired density of pile and any desired height of pile.

In order to more fully explain the instant invention, reference will now be had to the drawings illustrating an illustrative embodiment of the invention and wherein:

Figure 1 is a front elevation of the apparatus;

Figure 2 is a section taken on the line 2—2 of Figure 1;

Figure 3 is a side elevation of the yarn supply and appurtenant elements;

Figure 4 is a front elevation, partly in section, of the yarn supply and appurtenant elements shown in Figure 3;

Figure 5 is a front elevation of the yarn-feeding means;

Figure 6 is a side view of the yarn-feeding mechanism;

Figure 7 is a side elevation of the mechanism for imparting the additional forward movement to the yarns, the holding mechanism, and the cutting mechanism;

Figure 8 is a front elevation of the cutting mechanism and the actuating means therefor;

Figure 9 is a side elevation, partly in section, of the rotor and its disposition with respect to the yarn-feeding and cutting mechanisms;

Figures 10 and 10a together are a longitudinal section of the rotor carrying the gripper mechanisms;

Figure 11 is a side elevation of the gripper-closing means;

Figure 12 is a side elevation of the gripper-opening means;

Figure 13 is a front elevation, partly in section, of the gripper-openings means shown in Figure 12;

Figures 14, 15 and 16 illustrate the position of the cam-actuating mechanism for the gripper arms at various stages during the operation of the apparatus;

Figure 17 is a side elevation of the mechanism for actuating the take-up roll;

Figure 18 is a top view of the mechanism shown in Figure 17; and

Figure 19 is a section taken on the line 19—19 of Figure 17.

Referring now to the drawings wherein like reference numerals and like characters designate similar parts, the reference numerals 1 and 2 designate a pair of members suitably secured by various cross-pieces to constitute the frame and on which the various elements of the machine are mounted, as will hereafter be more fully set forth. A bracket 3, secured to the frame member 1, carries a motor 4. The motor shaft 5, through a train of gears 6 and 7, actuates a shaft 8. The shaft 8 is the main drive shaft of the machine and, as will appear, all mechanisms are actuated therefrom.

A plurality of yarns 10 constituting the pile-forming elements are unwound from a beam 12 fastened to a shaft 13, appropriately mounted in the frame, by a feed roll 14, which is intermittently actuated as more fully explained hereafter and with which an adjustable and retractable roller 16 cooperates. The feed roll 14, as well as the presser roll 16, may be provided with surfaces or coverings to increase the tractive effect thereof. The yarn, in its course of travel from the beam 12 to the rolls 14 and 16, is maintained under tension for reasons which will become apparent.

The tension means, as shown in Figures 3 and 4, comprises a brake band 18 which cooperates with a brake drum 20 carried on the shaft 13. One end of the brake band is secured at 22 on a yoke 38. The other end of the brake band 18 is adjustably secured to a brake lever 28. Though the brake band 18 may be adjustably secured to the lever 28 in various manners in the form shown (Figures 3 and 4), the band 18 is provided with a threaded extension, such as a screw 24, which passes through a lug 25 and secured in position by the nut 26. By proper adjustment of the screw 24 in the lug 25, the desired tension may be applied to the brake drum 20 through the brake band 18.

The brake lever 28 at one end thereof is pivotally mounted on the frame at 30. The other end of the lever 28 is free and carries an adjustable weight 32. As shown in Figure 3, the lever 28 is curved and is supported on a finger 34 which is carried on a tension shaft 36 mounted in a pair of yokes 38 secured to the opposite frame members. A pair of arms 40, suspended from the tension shaft 36, carry a tension roll 42.

As the yarns 10 are fed from the bottom of the beam 12 over the tension roll 36 and beneath a tension roll 42, the tension roll 42 is moved forward. The movement is transmitted to the finger 34 which, acting through the brake lever 28, releases the brake 18 and permits the yarns to be unwound from the beam 12.

The yarns 10 are then passed through a reed 44 positioned intermediate the tension roll 42 and the feed roll 14, whereby the yarns may be properly aligned. The reed 44 is of the usual type and is adjustably mounted on a support 46 (see Figure 7).

As previously mentioned, the feed roll 14 is intermittently rotated to intermittently feed the yarns from the beam 12, and the manner in which this is secured will now be described.

Referring now to Figures 5 and 6, a cam shaft 50, driven from the main drive shaft 8 as hereafter described, has secured thereto a feed cam 51 which drives a gear sector 52 through a cam follower. Due to the contour of the feed cam 51, the gear sector 52 transmits a rocking motion to a feed sector spur gear 56 secured adjacent one end of a short shaft 58 running through the left side end frame. On the other end of the shaft 58, there is fastened a chuck 60 which is adjustable by means of a screw 62. A stud nut 64 secures one end of a feed rod 66 to the screw 62. The other end of the feed rod 66 is connected at 68 to one end of a gear sector 70 which is loosely mounted on a shaft 72. A feed pawl 74, also carried by the gear sector 70, transmits the motion of the gear sector 70 to a toothed wheel 76 secured to the shaft 72 on which the feed roll 14 is secured. A second pawl 78, by means of a weighted arm 80, cooperates with the toothed wheel 76 to prevent retrograde movement thereof. The degree of rotary movement of the feed roll 14 depends on the degree of movement imparted to the toothed wheel 76 by the pawl 74. By varying the throw of the feed lever 66 by appropriate adjustment of the stud nut 64 on the chuck screw 62, the amount of rotation of the feed roll 14, and hence the feed of the yarns 10, can be regulated.

After the yarns leave the feed roll 14, they travel on a highly polished plate 84 adjustably carried on a cross-piece 85 and which, in fact, serves as a bottom knife. While the yarns 10 are on the plate 84, they are engaged and controlled by a pusher 86 that has a forward and backward as well as an up-and-down movement.

The forward and backward movements are obtained, as shown in Figure 7, through a gear sector 88 driven by the gear sector 70. The gear sector 88 is fastened to a shaft 90 which passes throughout the width of the machine. At each end of the shaft 90, there is provided a lever 92. One end of a lever 94 is secured to the lever 92 and the other end of the lever 94 is secured to one side of the yarn pusher 86. Since the forward and backward movements of the pusher 86 are secured through the gear sector 70, any adjustment of the feed of the yarn by the chuck 60 also changes the travel of the yarn pusher 86.

The up-and-down motion of the yarn pusher 86 is provided by a cam 96 on the cam shaft 50 and which transmits its motion to a follower 98 secured to the lower end of a lever 100 on which the pusher 86 rests.

The actuating mechanisms of the yarn pusher 86 are so adjusted and timed that the yarn pusher 86 will be in its lower position when the yarns are to be advanced; and in its upper position, not engaging the yarns, when the pusher has imparted the necessary movement to the yarns and it is desired to begin another advancing movement. In other words, the pusher 86 has a 4-motion feed. In its lower position, it engages the yarns to advance the same. As the limit of the advancement, the yarn pusher 86 is elevated and, while in the elevated position, is moved rearwardly until it is in its original position, at which time it is lowered to engage the yarns on the plate 84.

After the pusher 86 has advanced the yarns engaged thereby so that they are in position to be severed, the yarns are securely held in this position by a yarn-holding plate 102 so that they will not be disturbed during the time that the cutting operation is being effected. As shown in Figure 7, the yarn holder 102, which is of a length to engage all of the yarns fed to cutting position, is carried by a holder 104 which is secured to a rocking lever 106 through a stud 108. Rocking movement is imparted to the rocking lever 106 by an arm 110 which carries a cam follower 112 riding on a cam 114 on the cam shaft 50. By appropriate contour of the cam 114, the movement of the yarn holder 102 is so timed that it is lifted away from the yarns during the feed thereof and is in holding position just prior to and during the cutting operation.

When the yarns are in position to be cut and the yarn-holding plate 102 has been brought into engagement therewith, the projecting portions of the yarns to be severed are gripped by a gripper mechanism, hereinafter more fully described. The yarns, in the condition just described, are severed by means of a knife 120 which, as shown in Figure 8, is actuated through the main shaft 8 through a gear 122, carried on said shaft 8 and driving a gear 124 fastened on a knife shaft 126. An eccentric 128, which is secured to the shaft 126, is secured by means of a rod 130 to a knife holder 132 by a stud 134. The knife 120 is secured to the holder 132 in any suitable manner. It will be noted that the rod 130 is provided with a turnbuckle 136 whereby the rod 130 may be adjusted to compensate for any wear or sharpening of the knife 120.

The knife holder is guided at each end by a large bearing surface 138 carried on each side of the frame. A pair of spaced links 142 and 144, having one end thereof secured to the knife holder and the other ends secured to studs 146 and 148 respectively on a girt 140, secure the knife holder 132 to the girt 140 carried by the frame of the machine. The knife 120 is provided with a shearing action, and this is secured by making the link 142 slightly longer, such as $\frac{1}{16}$ of an inch, than the link 144. It is to be noted that the links 142 and 144 swivel on studs 146 and 148 respectively. Thus, it will be seen that through this arrangement, when the knife 120 is brought downward by the eccentric 128, the left side of the knife (see Figure 8) will cut the yarn on the left-hand side of the machine first. During the cutting operation, the yarns are cut by sliding as well as a side motion of the knife in the guides 138.

The weight of the knife 120 is compensated for by the use of a pair of counterbalanced weights 150, one at each side of the machine. Each of the weights 150 is slidably mounted on a rod 152, the lower extremity of the rod being securely fixed to the floor or platform on which the machine is placed. Each of the counterbalancing weights 150 is connected to one end of a chain 154, the other end of which is fastened to the knife holder 132 through a link 160. It is to be noted that each chain 154 passes over a sprocket 156 above the top of the knife holder 132 journalled in a bracket carried by the frame.

The grippers which grip the leading ends of the yarns prior to the severing thereof, convey the severed pile elements to the pile-depositing station, and embed the pile elements into the cementitious coating, are generally designated by the reference numeral 170. A plurality of such grippers 170 are equidistantly positioned around the periphery of a rotor, which is generally designated by the reference numeral 172. At each end, the rotor, which includes the cross-pieces 173, is provided (as shown in Figure 1) with an intermittent gear 174 which is driven by an intermittent gear 175 secured to the main shaft 8. Since, in the form shown, the rotor 172 is provided with eight grippers, the intermittent gearing 174 and 175 are each provided with a corresponding number (eight) of stops or dwells. It is to be understood that any number of grippers and corresponding number of dwells in the intermittent gears 174 and 175 may be used. The rotor 172 is provided with a brake shoe 176 which is locked into position intermittently by a disc 178 on the main shaft 8 during the periods of dwell.

The rotor 172 is intermittently rotated through the intermittent gearing 174 and 175 about a stationary shaft 180, the ends of which extend beyond the ends of the rotor and are secured at each end thereof in bearings 181 secured to the respective frame members. As shown in Figures 10 and 10a, on the shaft 180 there are provided three similar flanges 182, one adjacent each end and one in the middle of the rotor. Each flange is provided with eight grooves 183, and in each of said grooves there is slidably mounted a gripper carrier arm 184 on which one gripper 170 is mounted adjacent one end thereof, as hereafter more fully explained.

Referring now to Figures 10, 10a, 11, 12 and 13, each gripper 170 comprises a stationary jaw 186 and a movable jaw 188. The stationary jaw 186 is secured to the arm 184, and the movable jaw 188 is, as shown in Figures 12 and 13, movably carried on a gripper shaft 190 through a supporting piece 192 and a trigger disc 194. As shown in Figure 11, the trigger disc 194 is eccentrically mounted on the gripper shaft 190. One end of a tension spring 198 is attached to a pin 200 on the trigger disc 194, the other end of said spring being attached to a pin 202 on the gripper arm 184. The pin 200 is so positioned on the trigger disc 194 and the latter is so shaped and so mounted on the gripper shaft 190 that when the trigger disc 194 is actuated, as will be hereafter set forth, it will be thrown past its dead center about the gripper shaft 190 to a predetermined position (open or closed), and the spring 198 will maintain said disc in said position. A notch 204 in the edge of the trigger disc 194 cooperates with a pin 206 to limit the movement of the trigger disc in either direction. Cam-actuated means, as will hereafter be described, are provided to actuate the trigger disc 194 to close the jaws adjacent the yarn-severing station, to grip the yarns, and to release the yarns at the pile-depositing station.

At the yarn-severing position, the arm 184 carrying the gripper and in a horizontal position to grip the yarns is given a movement toward the left (see Figure 9) whereby the yarns may be gripped prior to the severing operation. At the pile-depositing position, the arm 184 carrying the gripper holding the pile element in a substantially vertical position and slightly spaced from the cementitious coating in the backing is given a downward movement whereby the lower free ends of the pile are embedded in the cementitious coating of the backing. As the rotor 172 is rotated by the intermittent gears 174 and 175, each arm 184 is guided by a cam mechanism to effect the aforementioned functions.

When the rotor is turned by the intermittent gearing, the carrier arms 184 are guided by means of a cam follower 208 riding in the cam groove 209 of a cam 210, which is keyed to the shaft 180. The deposit of a row of pile upon the backing, as previously described, is controlled by an up-and-down motion of the gripper carrier arm 184, which is operated by a cam slide 214 provided with a cam follower 214', which slides in a cam groove 211 of a cam 212 (see Figures 14, 15 and 16). The rotation of the cam 212 is secured through two gears 215, one at each end of the rotor and mounted on the main shaft 8 (see Figure 1). Each gear 215 actuates a gear 216 which runs idle on the end flanges 182 of the rotor. A flange gear 218 is fastened to the driving gear 216 and actuates a pinion 220. The pinion 220 is fastened to an intermediate shaft 222 which transmits motion to the cam 212 through a gear 224 on the shaft 222 to another gear 226 which is fastened to the cam 212.

As will be seen from the drawings (Figures 14, 15 and 16), the cam groove 209 of the cam 210 is provided with a rise 209', whereby the gripper arm (at that position) will be advanced (to the left in Figure 9) at the yarn-receiving position.

Further, it is to be noted that the cam 210 is provided with a vertical slot 225, one end of the cam groove 209 connecting with the bottom of said slot 225 and the other end of the cam groove 209 connecting with the top of the slot 225.

The groove 211 of the cam 212 is of such a design and the cam 212 is so timed that it moves the cam slide 214 through an up-and-down motion in such a manner that the slot 213 in the cam slide 214 will receive the cam follower 208, which rides in the groove 209 of cam 210 and moves the cam follower 208 through the slot 225, thereby transferring the cam follower 208 from the bottom of the slot 225 to the top thereof.

Figure 14 shows the position of the cam 212 after the gripper has delivered the yarn to the fabric and the slot 213 in the slide 214 is in position to let the cam follower 208 transfer from the slide 214 into the slot 209 of the cam 210. Figure 15 shows the position of the cam 212 after the gripper arm 184 has started to rotate and the slot 213 in the slide 214 is in position to receive the cam follower 208 from another gripper arm next in sequence. Figure 16 shows the position of the cam 212, slide 214 and cam follower 208 on the gripper arm 184 at the time the yarn is being deposited on the fabric.

When the rotor has been rotated so that a gripper is in position to grasp the leading end of the yarns at the severing station and the yarns have been disposed on the fixed jaw, a lever 230 is actuated so that it will strike the trigger disc 194, causing it to pass through dead center, in which position the spring 198 will hold it and whereby the movable jaw 188 carried by said trigger disc will come into close relationship with the fixed jaw 186 to provide the griping and holding action of the gripper. The lever 230 is provided at its lower end with a cam follower 234 which cooperates with a cam 236 on the cam shaft 50. The cam 236 and the form and shape of the lever 230 are such and are so timed that the lever 230 strikes the trigger disc 194 and causes the grippers to close just before the knife severs the yarns. In Figure 11, this motion is shown, with the trigger disc 194 in both the open (solid line) and closed (dotted line) positions.

Each gripper is opened at the pile-depositing station after embedding the pile and prior to retraction by a cam 244 which is secured to the hub 240 of the intermittent gear 175. At the depositing station, each gripper is opened when the trigger disc 194 engages and comes into contact with a lever 242, which is actuated by the cam 244 cooperating with a cam follower 246 on the lever 242. The lever 242 presses against a stud washer 248 fastened to the trigger disc 194, and the pressure against the washer actuates the disc and the grippers snap open. This action takes place when the gripper arm 184 is in its extreme down position, i. e., the position in which the yarn has been embedded in the coating on the backing.

A gripper-opening mechanism and a gripper-closing mechanism, of the types above mentioned, are mounted on each side of the rotor.

The fabric 250 which is to constitute the backing is delivered, as shown in Figure 2, from a roll 252 on the shaft 254 carried on a frame 255. The delivery of the fabric is controlled by a brake 256. The brake 256 is provided with a pair of ears 257 which cooperate with a screw 258 provided at one end of a hand grip 260. Upon rotation of the hand grip 260 in the desired direction, the tension on the brake 256 may be increased or decreased as desired. The fabric passes over a supporting roll 262 where the selected adhesive is applied from a hopper 264. The hopper is provided with a doctor blade 266 which governs the amount of adhesive applied to the backing. The doctor 266 is slidably positioned so that it can be adjusted to substantially uniformly apply and control the thickness of the adhesive.

The cementitious coated fabic is fed onto a table 280 positioned beneath the rotor 172. The table 280 is adjustable both vertically and horizontally. As shown in Figure 2, the coated fabric travels in a substantially horizontal plane from the adhesive-applying mechanism to and over the table 280. At the forward end of the table 280, the coated backing abruptly changes its direction by travelling downward at the edge 282. The bend in the coated fabric is substantially directly below the gripper in position to deposit the pile fabric, and the embedding of the fibers is effected substantially at the bend or beginning of the abrupt change in direction of travel of the adhesively coated fabric. The abrupt change in the direction of movement of the fabric permits the withdrawal of the previously inserted row of pile from out of the path of downward travel of the gripper depositing the next successive row of pile. It also permits close disposition of the rows of pile relative to each other.

The table 280 is adjustable in a horizontal plane so that the edge 282 can be properly positioned with respect to the grippers. The table 280 is also adjustable in a vertical plane in order to permit use of the apparatus with various thicknesses of backing and lengths of pile. In normal operation, the table 280 is adjusted so that the free ends of the pile held by the gripper in the pile-depositing position will be in spaced relationship with respect to the adhesive coating on the backing and substantially at right angles thereto at the place of deposit.

The fabric 250 is unwound from the roll 252 by means of an intermittently driven take-up roll 290. Movement of the roll 290 is secured through a gear 292 mounted on the shaft 291 of the roll 290 and which is driven by a gear 294 carried on a hub 295 provided on a toothed wheel 300 rotatably mounted on a stud shaft 296. Intermittent movement is imparted to the toothed wheel 300. As shown in Figures 18 and 19, a bell-crank lever 302 is freely mounted intermediate its ends on the hub 295, and a pawl 298 is carried on one end of said lever 302, the other end of the lever 302 being connected to one end 306 of an adjustable rod 308. The other end of the rod 308 is eccentrically mounted on the main drive shaft 8 (see Figure 1). It will be noted that as the motion from the main drive shaft 8 is transmitted to the pawl 298, the latter will engage the toothed wheel 300 to move it counter-clockwise. The rotation of the toothed wheel 300 will rotate the hub 295 carrying the gear 294, which in turn will operate the gear 292. A pawl 310 is provided in order to prevent retrograde movement of the toothed wheel 300.

It is desired that the roll 290 be intermittently rotated in a step-by-step movement, each step movement being sufficient to advance the coated backing a sufficient distance to space the consecutive rows of pile deposited on the backing. To secure the foregoing, the driving pawl 298 is, during its stroke, rendered ineffective with respect to the toothed wheel 300 and is permitted to be effective only to provide the necessary movement to the toothed wheel 300. As shown in Figures 17 and 18, the pawl 298 is caused to travel over the periphery of a segment 314 adjacent the toothed wheel 300. The periphery of the segment 314 is flush with the top of the toothed wheel 300. Thus, in its oscillating movement, the pawl 298 will first ride over the periphery of the segment 314, whereby it is rendered ineffective with respect to actuating the toothed wheel 300. Only after the pawl 298 leaves the segment 314 and engages the toothed wheel does it drive the toothed wheel 300.

The segment 314 is secured (fixedly) to the stud shaft 296 through a squared portion 299. To provide for adjusting the effective stroke of the pawl 298 on the toothed wheel 300, there is provided a second segment 315 whose peripheral surface is flush with the peripheral surface of the segment 314. The segment 315 is movably mounted on the stud 296, whereby its periphery can be adjusted with respect to the periphery of the segment 314. As shown in Figures 17 and 18, the segment 314 is provided with a screw 316 which extends through an arcuate slot 318 in the segment 315 whereby, upon application of the wing nut 320, the two segments are secured together. The segment 315 is, by means of a nut 297, held in position on the stud shaft 296. Upon adjustment of the segment 315 with respect to the segment 314, the peripheral portions of the two segments engaged by the pawl 298 may be increased or decreased, depending on the desired movement of the toothed wheel 300. A measuring device 330 is provided to indicate the necessary movement of the segment 315 with respect to the segment 314 to provide the desired adjustment.

The feed take-up roll 290 is in the nature of a card roll whereby it will positively engage the under side of the backing and advance it.

Upon leaving the roll 290, the pile fabric is passed into a chamber 332 wherein it is subjected to heat in order to firmly set the adhesive composition. In the event that the adhesive composition comprises a rubber adhesive, the rubber will be vulcanized during this operation. In the event that the adhesive composition sets upon the elimination of solvents, then the solvent will be eliminated in this operation. After leaving the heating chamber 332, the now finished pile fabric is wound up into a roll or cut into appropriate sizes, as desired.

As hereinbefore stated, the cam shaft 50 is driven from the main shaft 8. As shown in Figure 2, the shaft 8 is operatively connected, through the gears 122 and 124, to drive the shaft 126. The shaft 126 carries a mitre gear 340 which meshes with a mitre gear 342 at one end of a vertical shaft 343. The other end of the vertical shaft 343 is provided with a spiral gear 344 meshing with a spiral gear 346 which is mounted on the cam shaft 50.

As is apparent from the foregoing, all of the driving mechanisms are driven directly or through suitable connections from the main drive shaft. The various cams and actuating mechanisms are timed to effect the results at the required periods.

Since it is obvious that various changes and modifications may be made in the above description without departing from the nature or spirit thereof, this invention is not restricted thereto except as set forth in the appended claims.

I claim:

1. An apparatus for making pile fabrics which comprises means to intermittently feed a backing having a cementitious coating thereon to a pile-depositing station, means to intermittently feed a pile-forming material to a severing station, a knife to sever the leading edge portion of said pile-forming material, a rotor provided with a plurality of grippers, means to intermittently rotate said rotor to dispose a gripper in position to grip the leading edge portion of said pile material prior to severance thereof and after severance to dispose said gripper at the pile-depositing station in a substantially vertical position with the lower ends of the pile elements spaced from and at right angles to the point on the coating at which said lower ends are to be embedded, said rotor having means to advance said gripper in a direction toward the pile material at the severing station, and means to move the gripper downwardly at the pile-depositing station whereby the pile elements are embedded in the coating and upwardly after the pile elements have been embedded in the coating.

2. An apparatus for making pile fabrics which comprises means to intermittently feed a backing having a cementitious coating thereon to a pile-depositing station, means to intermittently feed a pile-forming material to a severing station, a knife to sever the leading edge portion of said pile-forming material, a rotor provided with a plurality of grippers, and means to intermittently rotate said rotor to dispose a gripper in position to grip the leading edge portion of said pile material prior to severance thereof and after severance to dispose said gripper at the pile-depositing station in a substantially vertical position with the lower ends of the pile elements spaced from and at right angles to the point on the coating at which said lower ends are to be embedded, said rotor having cam-controlled means to advance said gripper in a direction toward the pile material at the severing station, to move the gripper downwardly at the pile-depositing station whereby the pile elements are embedded in the coating, and to retract said gripper after the pile elements have been embedded in the coating.

3. An apparatus for making pile fabrics which comprises means to intermittently feed a backing having a cementitious coating thereon to a pile-depositing station, means to intermittently feed a pile-forming material to a severing station, a knife to sever the leading edge portion of said pile-forming material, a rotor having a stationary shaft and a plurality of spaced flanges rotatably mounted on said shaft, each flange having a plurality of members extending radially from the center thereof, a gripper carrier arm slidably positioned on each of said members, a gripper carried by gripper carrier arms correspondingly positioned on said spaced flanges, and means to intermittently rotate said flanges to dispose a gripper in position to grip the leading edge portion of said pile material prior to severance thereof and after severance to dispose said gripper at the pile-depositing station in a substantially vertical position with the lower ends of the pile elements spaced from and at right angles to the point on the coating at which said lower ends are to be embedded, said rotor having means to advance said gripper carrier arms in a direction toward the pile material at the severing station and downwardly at the pile-depositing station whereby the pile elements are embedded in the coating.

4. An apparatus for making pile fabrics which comprises means to intermittently feed a backing having a cementitious coating thereon to a pile-depositing station, means to intermittently feed a pile-forming material to a severing station, a knife to sever the leading edge portion of said pile-forming material, a rotor having a stationary shaft and a plurality of spaced flanges rotatably mounted on said shaft, each flange having a plurality of members extending radially from the center thereof, a gripper carrier arm slidably positioned on each of said members, a gripper carried by gripper carrier arms correspondingly positioned on said spaced flanges, and means to intermittently rotate said flanges to dispose a gripper in position to grip the leading edge portion of said pile material prior to severance thereof and after severance to dispose said gripper at the pile-depositing station in a substantially vertical position with the lower ends of the pile elements spaced from and at right angles to the point on the coating at which said lower ends are to be embedded, said rotor having cam means to advance said gripper carrier arms in a direction toward the pile material at the severing station and downwardly at the pile-depositing station whereby the pile elements are embedded in the coating.

5. An apparatus for making pile fabrics which comprises means to intermittently feed a backing having a cementitious coating thereon to a pile-depositing station, means to intermittently feed a pile-forming material to a severing station, a knife to sever the leading edge portion of said pile-forming material, a rotor having a stationary shaft and a plurality of spaced flanges rotatably mounted on said shaft, each flange having a plurality of members extending radially from the center thereof, a gripper carrier arm slidably positioned on each of said members, a gripper carried by gripper carrier arms correspondingly positioned on said spaced flanges, each gripper comprising a fixed jaw and a movable jaw mounted on a gripper shaft, a trigger disc carried by said gripper shaft, means to intermittently rotate said flanges to dispose a gripper in position to grip the leading edge portion of said pile material prior to severance thereof and after severance to dispose said gripper at the pile-depositing station in a substantially vertical position with the lower ends of the pile elements spaced from and at right angles to the point on the coating at which said lower ends are to be embedded, said rotor having cam means to advance said gripper carrier arms in a direction toward the pile material at the severing station, downwardly at the pile-depositing station whereby the pile elements are embedded in the coating, and upwardly at the pile-forming station after the pile elements have been embedded, means to actuate the trigger disc to close said jaws at the pile-severing station, and means to actuate the trigger disc to open said jaws prior to retraction at the pile-depositing station.

6. An apparatus for making pile fabrics which comprises means to intermittently feed a backing having a cementitious coating thereon to a pile-depositing station, a table, means to intermittently feed a pile-forming material over said table to a severing station, a knife cooperating with the forward edge of said table to sever the leading edge portion of said pile-forming material, a rotor having a stationary shaft and a plurality of spaced flanges rotatably mounted on said shaft, each flange having a plurality of members extending radially from the center thereof, a gripper carrier arm slidably positioned on each of said members, a gripper carried by gripper carrier arms correspondingly positioned on said spaced flanges, each gripper comprising a fixed jaw and a movable jaw mounted on a gripper shaft, a trigger disc carried by said gripper shaft, means to intermittently rotate said flanges to dispose a gripper in position to grip the leading edge portion of said pile material prior to severance thereof and after severance to dispose said gripper at the pile-depositing station in a substantially vertical position with the lower ends of the pile elements spaced from and at right angles to the point on the coating at which said lower ends are to be embedded, said rotor having cam means to advance said gripper carrier arms in a direction toward the pile material at the severing station, downwardly at the pile-depositiong station whereby the pile elements are embedded in the coating, and upwardly at the pile-forming station after the pile elements have been embedded, a cam-controlled lever to actuate said trigger disc to move the movable jaw to closed position at the severing station, and a cam-controlled lever to actuate said trigger disc to move the movable jaw to open position at the pile-depositing station.

7. An apparatus for making pile fabrics which comprises means to intermittently feed a backing having a cementitious coating thereon to a pile-depositing station, a table, means to intermittently feed a pile-forming material over said table to a severing station, a knife cooperating with the forward edge of said table to sever the leading edge portion of said pile-forming material, a rotor having a stationary shaft and a plurality of spaced flanges rotatably mounted on said shaft, each flange having a plurality of members extending radially from the center thereof, a gripper carrier arm slidably positioned on each of said members, a gripper carried by gripper carrier arms correspondingly positioned on said spaced flanges, each gripper comprising a fixed jaw and a movable jaw mounted on a gripper shaft, a trigger disc carried by said gripper shaft, a pair of intermittent gears at each end of said rotor to rotate said flanges to dispose a gripper in position to grip the leading edge portion of said pile material prior to severance thereof and after severance to dispose said gripper at the pile-depositing station in a substantially vertical position with the lower ends of the pile elements spaced from and at right angles to the point on the coating at which said lower ends are to be embedded, said rotor having cam means to advance said gripper carrier arms in a direction toward the pile material at the severing station, downwardly at the pile- depositing station whereby the pile elements are embedded in the coating, and upwardly at the pile-forming station after the pile elements have been embedded, a cam-controlled lever to actuate said trigger disc to move the movable jaw to closed position at the severing station, a lever to actuate said trigger disc to move the movable jaw to open position at the pile-depositing station, and cam means carried by the intermittent gearing controlling the jaw-opening lever.

8. An apparatus for making pile fabrics which comprises means to intermittently feed a backing having a cementitious coating thereon to a pile-depositing station, means to intermittently feed a pile-forming material to a severing station, a knife to sever the leading edge portion of said pile-forming material, a rotor having a stationary shaft and a plurality of spaced flanges rotatably mounted on said shaft, each flange having a plurality of members extending radially from the center thereof, a gripper carrier arm slidably positioned on each of said members, a gripper carried by gripper carrier arms correspondingly positioned on said spaced flanges, and means to intermittently rotate said flanges to dispose a gripper in position to grip the leading edge portion of said pile material prior to severance thereof and after severance to dispose said gripper at the pile-depositing station in a substantially vertical postion with the lower ends of the pile elements spaced from and at right angles to the point on the coating at which said lower ends are to be embedded, each of said gripper arms being provided with a cam follower, a cam cooperating with said cam follower, said cam having a cam groove provided with a rise to advance the gripper arms forwardly at the pile-receiving position and a slot at the pile-depositing station, a cam slide cooperating with a cam groove in a second cam, said cam groove of said second cam imparting an up-and-down movement to said slide at the pile-depositing station, said cam slide having a slot to receive said cam follower and transfer the same from the bottom to the top of the slot in the first-mentioned cam.

LEROY N. LINSCOTT.

CERTIFICATE OF CORRECTION.

Patent No. 2,385,925.　　　　　　　　　　　　　　　October 2, 1945.

LEROY N. LINSCOTT.

It is hereby certified that error appears in the printed specification of the above numbered patent requiring correction as follows: Page 3, first column, line 55, for "As" read --At--; and second column, line 56, before the word "journalled" insert --and--; page 5, first column, line 23, for "fabic" read --fabric--; and page 7, second column, line 42, claim 8, for "postion" read --position--; and that the said Letters Patent should be read with this correction therein that the same may conform to the record of the case in the Patent Office.

Signed and sealed this 25th day of December, A. D. 1945.

(Seal)

Leslie Frazer
First Assistant Commissioner of Patents.